No. 616,348. Patented Dec. 20, 1898.
O. O. OZIAS.
PRICE AND WEIGHING SCALE.
(Application filed Apr. 23, 1897.)

(No Model.) 4 Sheets—Sheet 1.

Witnesses: Inventor:
Orange O. Ozias
by Church & Church
his Attorneys.

THE NORRIS PETERS CO., PHOTO-LITHO., WASHINGTON, D. C.

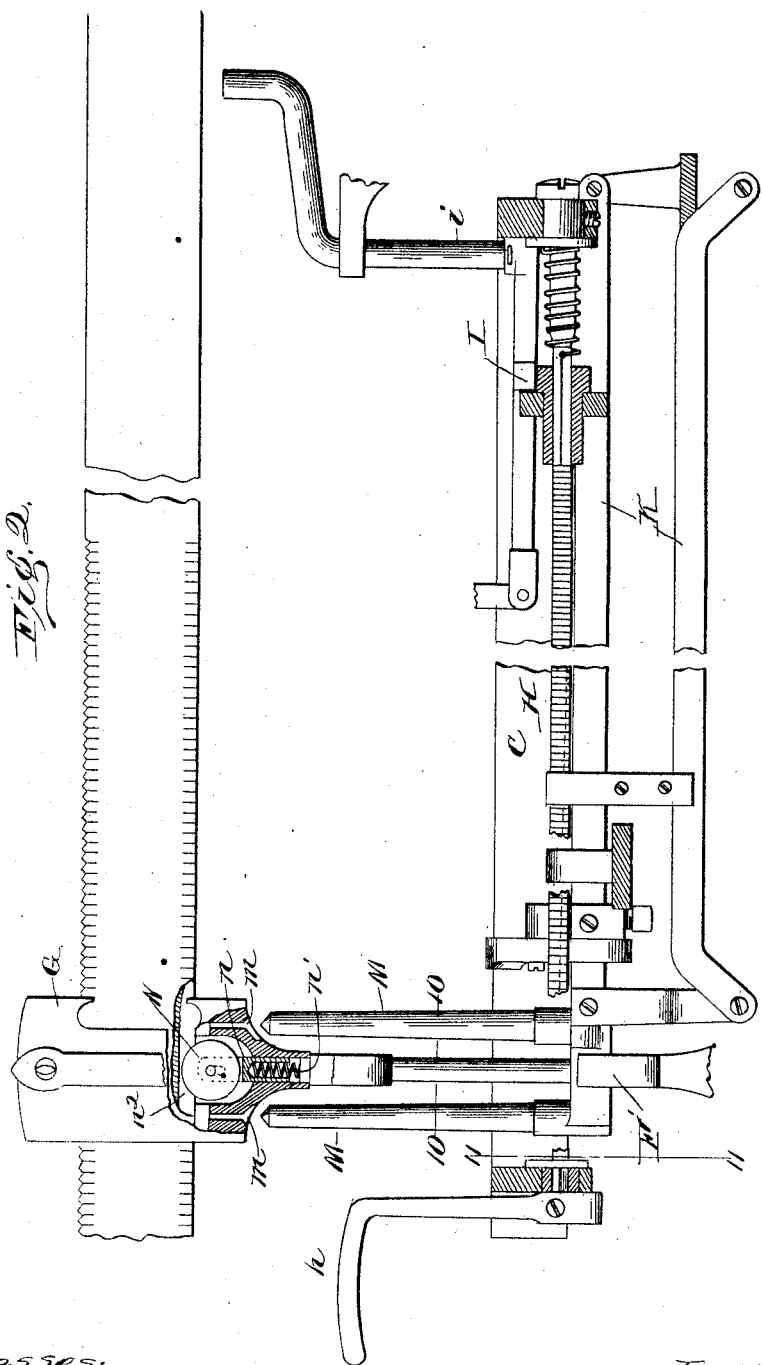

No. 616,348. Patented Dec. 20, 1898.
O. O. OZIAS.
PRICE AND WEIGHING SCALE.
(Application filed Apr. 23, 1897.)
(No Model.) 4 Sheets—Sheet 3.

Witnesses:
J. M. Fowler Jr
Alex J. Stewart

Inventor:
Orange O. Ozias
by Church & Church
his Attorneys

No. 616,348. Patented Dec. 20, 1898.
O. O. OZIAS.
PRICE AND WEIGHING SCALE.
(Application filed Apr. 23, 1897.)
(No Model.) 4 Sheets—Sheet 4.
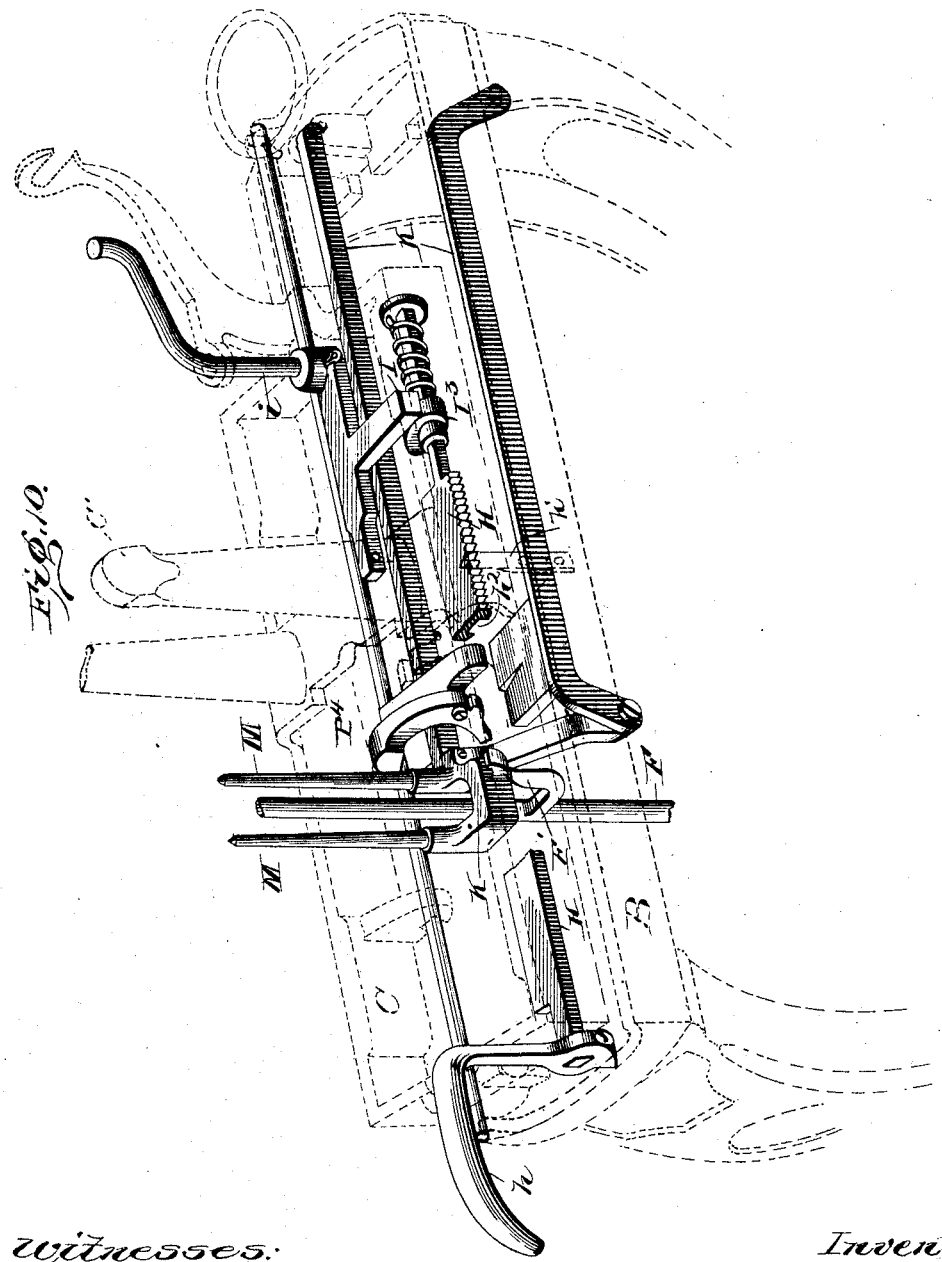
Witnesses:
J. M. Fowler Jr.
Alexander Stewart
Inventor:
Orange O. Ozias
by Church & Church
his Attorneys.

UNITED STATES PATENT OFFICE.

ORANGE O. OZIAS, OF DAYTON, OHIO.

PRICE AND WEIGHING SCALE.

SPECIFICATION forming part of Letters Patent No. 616,348, dated December 20, 1898.

Application filed April 23, 1897. Serial No. 633,502. (No model.)

*To all whom it may concern:*

Be it known that I, ORANGE O. OZIAS, of Dayton, in the county of Montgomery and State of Ohio, have invented certain new and useful Improvements in Price and Weighing Scales; and I do hereby declare the following to be a full, clear, and exact description of the same, reference being had to the accompanying drawings, forming a part of this specification, and to the letters of reference marked thereon.

This invention relates to improvements in computing or price scales—such, for instance, as is set forth in my prior patent, No. 527,124, dated October 9, 1894; and, like the invention described in said patent, the improvements relate particularly, but not exclusively, to that class of scales in which the longitudinally-movable price-beam is employed in connection with a relatively-stationary head-block or connection between the beam and platform, although it will be readily understood that these conditions may be reversed, the beam being made stationary and the head-block movable, both forms of scales being old and well known in the art at this date.

The objects of the invention are to simplify and improve the detail construction of the parts, whereby a more perfect scale may be produced and a scale which is less likely to become disarranged, be thrown out of order, or wear so as to become inoperative and hard to operate.

Figure 1:
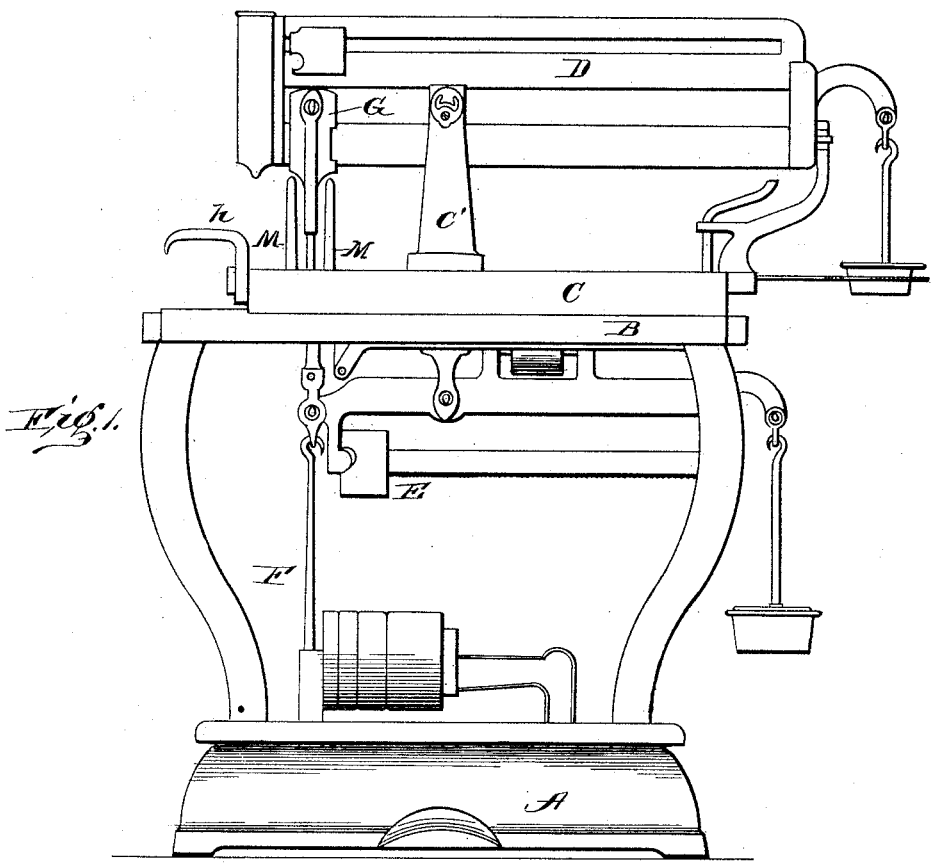
Figure 9:
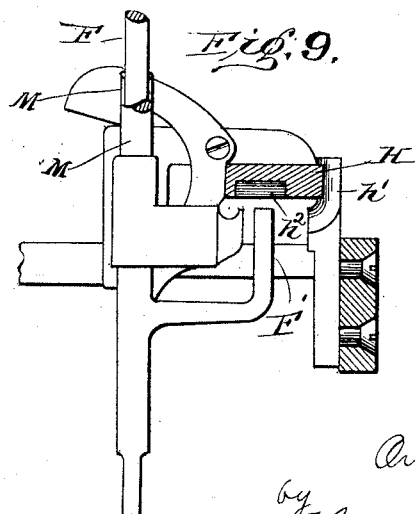
Figure 3:
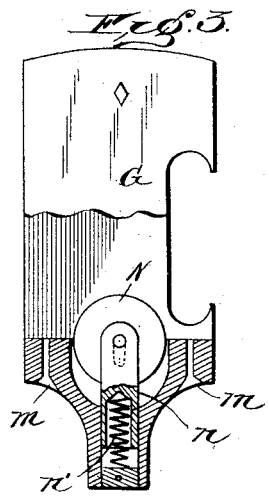
Figure 4:
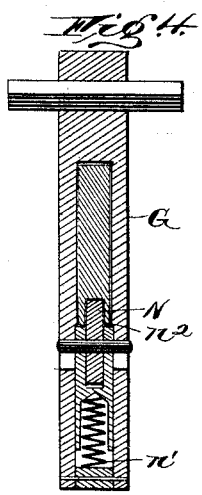
Figure 5:
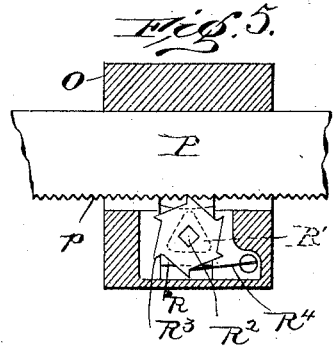
Figure 6:
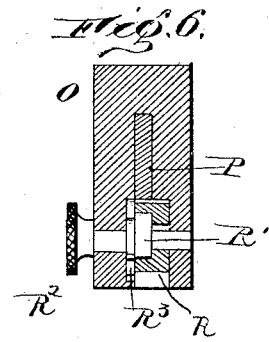
Figure 7:
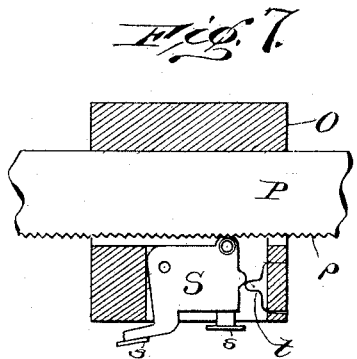
Figure 8:
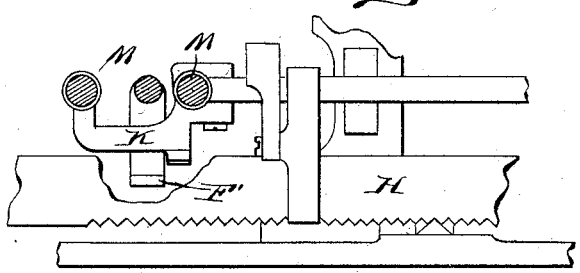

Referring to the accompanying drawings, Figure 1 is a front elevation of a scale, showing the general arrangement of parts. Fig. 2 is an enlarged sectional detail, partially broken away, showing the price-beam, its connections, and a portion of the carriage in which the price-beam is mounted. Figs. 3 and 4 are detail sections, taken at right angles to each other, through the head-block before referred to. Figs. 5 and 6 are sections through the poise, showing the snap-lock. Fig. 7 is a section corresponding to Fig. 5, showing a modified form of lock. Fig. 8 is a detail section on the line 10 10, Fig. 2, looking down, with parts broken away. Fig. 9 is a section on the line 11 11, Fig. 2, looking toward the right, with portions broken away to show the underlying parts. Fig. 10 is a perspective view of the carriage and the controlling mechanism for the stop-rests and carriage, the frame of the carriage and the bed upon which it rests being shown in dotted lines.

Like letters of reference in the several figures indicate the same parts.

The general construction and arrangement of the frame and parts correspond to the construction and arrangement of the parts illustrated and described in my before-mentioned patent and to the patents referred to therein. Consequently no detailed description of them is necessary at this time. Suffice it to say that A indicates the platform-base, B the supplemental base, and C the carriage, working longitudinally of the supplemental base B, and having pivoted therein in bearings C' the usual price-beam D. Hung beneath the supplemental base B is the usual weighing or tare beam E, connected at one end with the platform connections F, which latter also extend up and by means of the usual fork connect with the head-block G, movably connected with the price-beam D. Journaled in the carriage C is a cam-rack bar H, Figs. 2, 8, 9, and 10, having at one end a handle $h$. In normal position the toothed edge of the bar H is adapted to engage a fixed curved-faced tooth $h'$, Fig. 9, fixed on the frame B for locking the carriage in its adjusted position, but when turned to a position at right angles to that shown in Figs. 9 and 10 the carriage is released and may then be moved back and forth upon the supplemental base B, as in the said patents, the turning of the cam-rack bar not only releasing the carriage, as just explained, but through the medium of the cam $I^3$, the pivoted supplemental support I, Figs. 2 and 10, and a sliding rod $i$ it coöperates with and supports the right-hand end of the price-beam and simultaneously lifts and supports the left-hand end of the price-beam through the medium of stop-rests M, which will be presently particularly described.

In the underside of the cam-rack bar there is formed a tapering recess $h^2$, (shown in Figs. 9 and 10 and in dotted lines, Fig. 2,) into which recess the end of the arm F' on the platform connection F is adapted to enter when the platform connection F moves upward, by which arrangement the movement of said connection is made uniform regardless of the relative positions of the head-block and fulcrum of the price-beam, and whereby also the lifting of the price-beam from its bearings is prevented, as might otherwise occur were the platform connections permitted to have an unlimited upward movement.

The head-block in the present device is provided on its under side or end with two conical recesses $m$, Fig. 2, preferably formed by countersinking drill-holes therein, and coöperating with these recesses are two standards or stop-rests M, mounted pivotally at their lower ends upon the ends of the pivoted arms K. Thus when said arms K are swung upwardly by the turning of the cam-rack bar and supported by the pawl $P^4$, Fig. 10, as in said prior patented and well-known structure, the standards M engage the head-block and lift the same, thereby supporting said head-block and through it the left-hand end of the price-beam. This construction accurately centers the head-block at each operation and prevents any possible lateral movement or movements of the same longitudinally of the price-beam, either bodily or pivotally, which latter movement might occasion a binding action upon the price-beam, thereby preventing its free and easy movement through the head-block.

With a further view to preventing any possible binding action of the head-block and price-beam and to at the same time insure a proper locking together and coöperation of these parts I provide in the head-block beneath the price-beam an antifriction-roller N. This antifriction-roller is mounted in a vertically-movable bearing-piece $n$, held upwardly and with the roller against the under side of the price-beam by means of a spring $n'$.

In the preferred construction the beam is recessed in its under edge, as shown at $n^2$, Fig. 2, and in cross-section in Fig. 4, and the antifriction-roller placed in this recess, whereby not only is the beam supported on the roller-bearing, preventing friction at the bottom of its opening through the head-block, but it is also supported against lateral movement and contact with the sides of its openings through the head-block, insuring a perfectly free and easy movement of the beam and head-block with respect to each other at all times. In this connection it will be noted that the spring $n'$ should be only of sufficient strength to hold the roller in contact with the beam and lock the head-block thereto with sufficient strength to operate the beam in its pivotal movement, but it should not be of sufficient strength to support the left hand end of the beam when the head-block is raised by means of the stop-rests, as under the latter conditions there is a slight vertical movement of the head-block with relation to the beam in order to disengage the head-block from the toothed or notched upper edge of the beam, and then the bearings for the antifriction-roller will be at the extreme of their independent downward movement and will form a rigid support for the roller, while the latter in turn supports the said beam.

A difficulty has heretofore been experienced, particularly in scales of this character, in providing a poise which might be moved along on a smooth bearing and held in its adjusted position firmly at any particular point where the graduations are extremely fine, and with a view to overcoming this difficulty I now provide a beam preferably having a smooth top or upper surface and a very finely serrated or toothed under surface and mount a poise on this beam so as to slide freely thereon, but lock said poise by means of a locking device engaging the said under serrated or toothed surface. In Figs. 5 to 7, inclusive, I have illustrated such a poise, and by these figures it will be seen that the poise (lettered O in every instance) is provided with a slot or aperture therethrough for the passage of the beam P, said beam having its upper edge smooth to form a smooth way on which may poise my slide, while its lower edge $p$ is finely toothed or serrated. A spring-pressed lock, which may be snapped in or out of engagement at the will of the operator, is preferably employed. In Figs. 5 and 6 a positive lock is shown, consisting of a lock-block R, sliding in a bearing in the poise and having a recess coöperating with a three-cornered cam R', mounted on a milled-headed shaft $R^2$, whereby when the shaft is turned to throw one corner of the cam upward the lock is thrown into engagement with the serrations, as shown in Fig. 5, and the poise held against longitudinal movement; but when said shaft is given a one-third turn the lock is withdrawn from engagement with the teeth or serrations and the poise is then free to be moved in either direction. For the purpose of indicating when the lock is engaged or disengaged and for holding it in its position of adjustment the shaft $R^2$ is provided with a click-wheel $R^3$, with which the spring $R^4$ coöperates, the number of projections or teeth on the wheel $R^3$ being double the number of projections on the cam, whereby as the shaft is turned, when the spring snaps over one tooth, it will be known that the lock is in or out of engagement, as the case may be, and when the spring snaps over the next projection the said lock will be in its opposite position. In Fig. 7 the poise is provided with a locking-block S, preferably pivotally mounted in the poise, with two finger-pieces $s$ for throwing it into or out of engagement with the serrations on the bar, said locking-piece S in this instance being held in or out of engagement by spring-pressure through the medium of a spring-key in the poise coöperating with the projection $t$ on the locking piece or block. In this instance also I prefer to make use of a roller, said roller being mounted in the block S, whereby the poise may at will be moved against the resistance of the roller, or the roller may be thrown out of engagement with the serrations entirely and the poise be left free to move in either direction. With a snap-lock of this or equivalent character the poise may be set in the ordinary manner to balance the beam, a result which cannot be secured where the lock must be held out of engagement by hand during the time the poise is being shifted.

Having thus fully described my invention, what I claim as new, and desire to secure by Letters Patent, is—

1. In a price-indicating scale the combination with the relatively-movable price-beam and head-block and the connections interposed between said head-block and platform, of a stop-rest independent of the platform connection having bearings separated from each other in the plane of relative movement of the head-block and beam, said bearings coöperating with the head-block to hold the same in vertical position during the relative movement of the beam and head-block; substantially as described.

2. In a price-indicating scale the combination with the relatively-movable price-beam and head-block, and connections between the said head-block and platform, of a stop-rest independent of the platform connection having bearings separated in the plane of relative movement of the beam and head-block and coöperating bearings on the head-block on each side of the platform connections, whereby tilting of the head-block in the plane of relative movement of the head-block and beam is prevented; substantially as described.

3. In a price-indicating scale, the combination with the relatively-movable price-beam and head-block and the platform connection between said head-block and platform, of a vertically-movable stop-rest independent of the platform connection and coöperating recessed and projected bearing-surfaces on the upper end of said stop-rest and under side of the head-block below the plane of the beam; substantially as described.

4. In a price-indicating scale the combination with a relatively-movable price-beam and the head-block and connections between said head-block and platform, and an antifriction-roller mounted in the head-block and bearing against the under edge of the beam, whereby a rolling contact or point of support is afforded during the relative movements of the parts with means for supporting the head-block independent of the platform connections; substantially as described.

5. In a price-indicating scale, the combination with the relatively-movable price-beam and head-block and connections between said head-block and platform, and an antifriction-roller mounted in the head-block and bearing against the under edge of the beam, and a stop-rest independent of the platform connections for supporting said head-block during the relative movements of the head-block and beam; substantially as described.

6. In a price-indicating scale, the combination with the relatively-movable price-beam and head-block and connections between said head-block and platform, of a spring-pressed antifriction-roller, mounted in the head-block, and coöperating with the under edge of the beam, and the stop-rests for supporting said head-block; substantially as described.

7. In a price-indicating scale, the combination with the relatively-movable price-beam and head-block and connections between said head-block and platform, said beam being notched on its upper edge for holding the head-block in adjusted position, of a spring-pressed antifriction-roller mounted in the head-block and coöperating with the lower edge of the computing-beam, and a stop-rest coöperating with the head-block to elevate the same, release the same from the notches in the top of the beam and support the beam on the antifriction-rollers; substantially as described.

8. In a price-indicating scale, the combination with the longitudinally-movable price-beam and the connector extending between the platform and the beam and adjustably connected to the latter, of a support or stop-rest for holding said connector while the beam is being shifted and a support for the forward end of the beam, consisting of an upwardly-extending rod, movable longitudinally with the beam, with means for elevating said rod; substantially as described.

9. In a price-indicating scale, the combination with the base, the carriage movable longitudinally thereon, the price-beam fulcrumed on the carriage, the head-block on the beam and the connector for the platform connected with said head-block, of the arms pivotally mounted on the base, and the upwardly-extending rods or stop-rests M, M, rigidly mounted on said arms, and coöperating at their upper ends with the under side of the head-block beneath the beam, on each side of platform-connector, with means for raising and lowering said arms and stop-rests; substantially as described.

10. In a scale, the combination with a pivoted and balanced scale-beam having a smooth surface or track and a finely-serrated surface, of a poise movably supported on the smooth surface of the beam, a lock carried by the poise, a spring for holding the lock either in or out of engagement with the serrated surface of the beam and two oppositely-movable finger-pieces controlling the lock, whereby when one finger-piece is moved, the lock will be thrown into operative position and when the other finger-piece is moved the lock will be thrown out of operative position; substantially as described.

11. In a scale, the combination with the beam having a smooth upper edge and finely-serrated lower edge, of a poise sliding on the beam, a lock pivoted in the poise, and a spring for holding the said lock in or out of engagement with the beam, substantially as described.

12. In a scale, the combination with the beam having a smooth upper edge and a serrated lower edge, of a poise sliding on the beam, a lock pivoted in the poise, a spring for holding said lock in or out of engagement and a roller forming the engaging face of the lock; substantially as described.

ORANGE O. OZIAS.

Witnesses:
   GEO. W. KEPLER,
   ETHEL SMITH.